United States Patent [19]

Itoyama et al.

[11] Patent Number: 6,007,650
[45] Date of Patent: *Dec. 28, 1999

[54] VACUUM LAMINATING APPARATUS AND METHOD

[75] Inventors: Shigenori Itoyama; Kimitoshi Fukae; Yuji Inoue, all of Nara, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,714

[22] Filed: Aug. 2, 1996

[30] Foreign Application Priority Data

| Aug. 10, 1995 | [JP] | Japan | 7-204193 |
| Aug. 10, 1995 | [JP] | Japan | 7-204194 |
| Aug. 10, 1995 | [JP] | Japan | 7-204195 |
| Aug. 10, 1995 | [JP] | Japan | 7-204196 |

[51] Int. Cl.⁶ .............................................. B32B 31/20
[52] U.S. Cl. ........................... 156/87; 156/99; 156/285; 156/286; 156/289; 156/309.6; 156/382; 156/583.3

[58] Field of Search ....................... 156/104, 285, 156/286, 382, 583.3, 289, 298, 309.6, 293, 87, 99

[56] References Cited

U.S. PATENT DOCUMENTS

| 2,837,453 | 6/1958 | Englehart et al. | 156/104 |
| 3,912,542 | 10/1975 | Hirano | 156/104 |
| 4,425,406 | 1/1984 | Palma | 156/286 |
| 5,261,993 | 11/1993 | Dahlgren | 156/286 |
| 5,593,532 | 1/1997 | Falk | 156/285 |

FOREIGN PATENT DOCUMENTS 61-237481  10/1986  Japan .

*Primary Examiner*—Michael W. Ball
*Assistant Examiner*—Michael A Tolin
*Attorney, Agent, or Firm*—Fitzpatrick, Cella, Harper & Scinto

[57] ABSTRACT

A vacuum laminating apparatus includes a laminating space formed by a base member, a tube having deaeration holes, and a flexible lid member. A vacuum laminating method places the material to be laminated within the laminating space and heats the material while creating a vacuum in the space.

25 Claims, 14 Drawing Sheets

6,007,650

VACUUM LAMINATING APPARATUS AND METHOD

BACKGROUND OF THE INVENTION

1. Field of the Invention

The present invention relates to a vacuum laminating apparatus and method, and more particularly to a vacuum laminating apparatus and method which is applicable to, e.g., a manufacturing system for the solar cell module.

2. Related Background Art

Conventionally, a vacuum laminating apparatus was applied as a final manufacturing system for the purpose of covering the elements exposed in use to the outer atmosphere, such as semiconductor devices, in particular, solar cells. This was conducted to enhance the durability of such elements against the temperature/humidity and the external pressure.

FIGS. 17 and 18 show the material constitution of a solar cell module in the state where the materials are laminated and the state where the solar cell module is completed, respectively. In these figures, 1701 is a surface covering material, 1702 is a filler, 1703 is a solar cell element, and 1704 is a back covering material.

As one procedure of making a solar cell module, a material constituting the solar cell module is first laid down within a vacuum apparatus, and a vacuum is created to evacuate the air from between materials, or perform the so-called deaeration. Then, the materials are heated in this vacuum state. Due to heating, the temperature of material will rise up to a temperature for allowing the filler to be bridged or cured, this temperature being retained for a predetermined time until the filler is fully cured. Thereafter, the materials are cooled, and placed in atmospheric pressure again by stopping to pull the vacuum. With this procedure, the solar cell with a constitution as shown in FIG. 18 is completed.

FIGS. 20 to 22 are views for explaining the construction of a vacuum laminating apparatus which is applicable to a conventional manufacturing system for the solar cell module. FIG. 20 is an overall view, FIG. 21 is a cross-sectional structural view of FIG. 20, and FIG. 22 is a cross-sectional structural view in making the solar cell module. In these figures, 701 is a main body lid portion, 702 is a main body, 703 is a vacuum pump for the main body lid portion, 704 is a vacuum pump for the main body, 705 is a silicone rubber, 706 is a base, 707 is a heater, and 708 is a solar cell module component material.

A procedure of making a solar cell module in a vacuum laminating apparatus for the solar cell module as above described is as follows. First, as shown in FIG. 20, the solar cell module component material 708 is placed on the base 706 within the main body 702 which is opened. Then, the vacuum pump 703 for the main body lid portion is activated to create a vacuum in the main body lid portion. And after the main body lid portion 701 is closed, the vacuum pump 704 for the main body is activated to evacuate the main body of the air. When the main body lid portion 701 and the main body 702 become stable at the respective degrees of vacuum (with a vacuum meter not shown), the vacuum pump 703 for the main body lid portion is stopped to return the inside of the main body lid portion to atmospheric pressure. And the heater 707 is activated to raise the temperature up to a predetermined value, at which value the temperature is retained for a predetermined time, and then stopped to allow the cooling. If the cooling is fully achieved, the vacuum pump 704 for the main body is stopped to return the inside of the main body to atmospheric pressure, so that the solar cell module as shown in FIG. 18 is completed. Herein, the predefined temperature condition with the heater 707 involves a temperature at which the filler in the solar cell module component material can be cured or bridged. Also, the set time for maintaining such high temperature is a time for the filler to be completely cured or bridged.

However, this conventional vacuum laminating apparatus of the solar cell module is very heavy in weight, with poor operation efficiency, since the main body 702 and the main body lid portion 701 are made of metal. Also, owing to a great heat capacity of the base 706 within the main body, the temperature of the solar cell module component material 708 quite slowly rises or falls, even if the heater 707 is operated, resulting in longer time of heat treatment. Further, among the solar cells, an amorphous silicone solar cell is well suited to the constitution of larger area, but this conventional vacuum laminating apparatus for the solar cell module, having the above-mentioned structure, has a problem that it is difficult to easily construct the larger apparatus to produce the solar cell module with the larger area.

An object of the present invention is to provide a vacuum laminating apparatus and method which is simple in structure, and is capable of making the larger area, with the shorter processing time.

SUMMARY OF THE INVENTION

Figure 1:
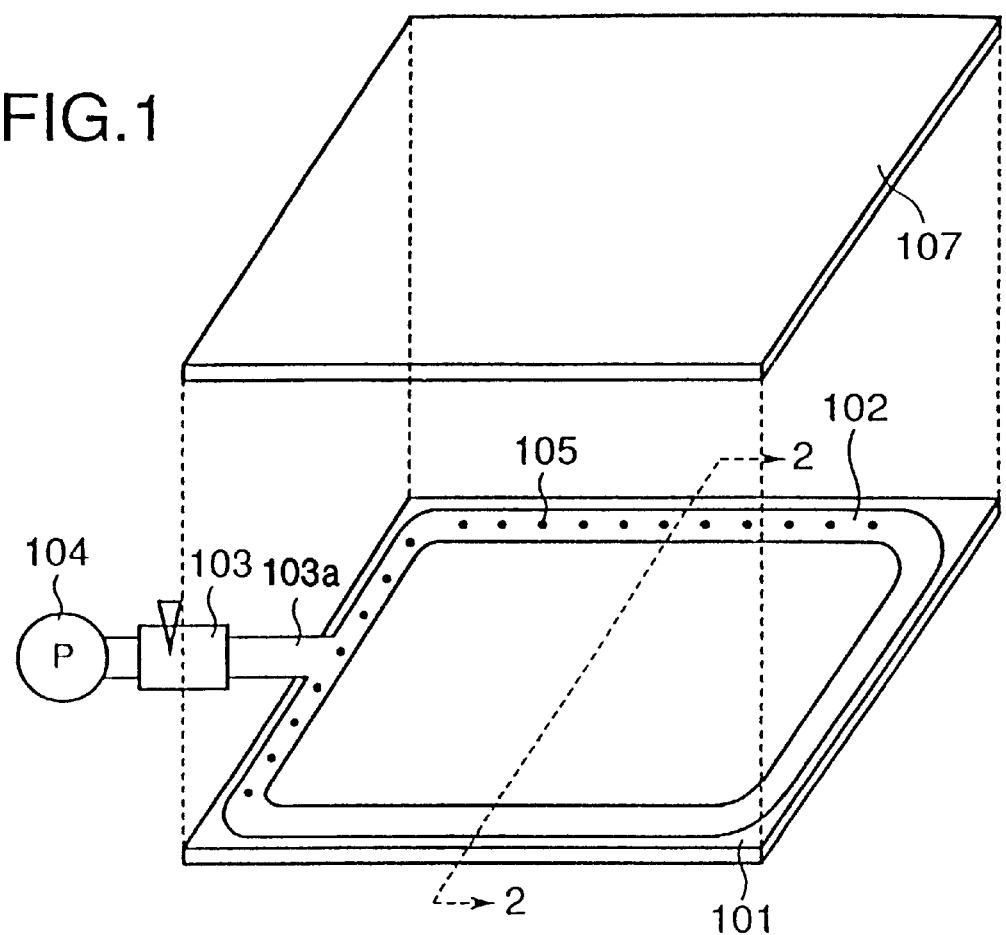
FIG. 1 is a perspective view showing a vacuum laminating apparatus of the present invention.

The present invention resides in a vacuum laminating apparatus in which a laminating space is formed of a base member, a tube having a deaeration hole, and a flexible lid member. If this apparatus is used for lamination, the laminating operation becomes simple, because the apparatus has a simple structure and light weight, and the processing time can be shortened, because in the heat treatment the temperature rises or falls rapidly, due to a small heat capacity of the apparatus.

Further, with a net disposed over the entire surface between the lid member and the base member, a space for ventilation can be securely provided between the lid member and the base member, thereby making it possible to sufficiently create the vacuum.

Further, since the angle made by the straight line connecting the center of the tube to the deaeration hole with respect to the vertical plane ranges from 0 to 90 degrees, the deaeration hole is less likely to be closed with the lid member, thereby making it possible to sufficiently create the vacuum.

Also, the invention is characterized by comprising a cushioning material disposed along the inside of the tube, whereby the lid member is less susceptible to steep flexure by the vacuum.

DESCRIPTION OF THE PREFERRED EMBODIMENTS

A vacuum laminating apparatus of the present invention will be described with reference to FIGS. 1 to 3.

(Base member)

A plate-like base member is a member making up the bottom portion of the vacuum laminating apparatus. The plate-like base member for use with a manufacturing system of the solar cell module in this application example is required to have characteristics such as heat resistance, rigidity, light weight, and surface adhesiveness. The material used for this member is mainly a metal such as iron and aluminum. To achieve the light weight, this member must be thin, but can not be too thin, because it becomes less rigid. Preferably, an iron plate having a thickness of 1.5 to 2.0 mm is used. In some case, a barrel tube 102 may be adhered with a sealant. Hence, the surface is preferably chemically treated with phosphate to improve the adhesive property.

(Tube)

The barrel tube 102 is a tube for creating the vacuum. A space portion 108 in which the vacuum is created is made up of the base member 101 and the lid member 107 which is laid thereon. The characteristics required for this barrel tube 102 include heat resistance, rigidity and light weight. The material is mainly stainless. The shape of the tube may be circle or polygon in cross section. The deaeration holes 105 for creating the vacuum provided on the lateral face of the barrel tube 102 and along the inner periphery thereof are desirably opened before assembling the vacuum laminating apparatus. In some cases, the barrel tube 102 may be adhered onto the plate-like base member 101. In such cases, the barrel tube 102 is preferably treated for deaeration before the adhesion. The size thereof is such that an outer frame of an annular body can be accommodated within the plate-like base member 101. There are also provided an opening portion 103a for connecting the vacuum pump for pulling the vacuum and a valve 103.

The deaeration holes 105 are useful for deaeration in creating the vacuum, and provided on the side of the barrel tube 102 facing the space, i.e., along the inside of the annular body. Around the entire area of the barrel tube 102 on the side of the space for creating the vacuum, i.e., along the four sides of the annular body which is made substantially quadrilateral, the deaeration holes are provided preferably at an equal interval before the annular body is secured to the plate-like base member 101.

(Securing member)

A securing member is one for securing the barrel tube 102 without yielding the clearance between the barrel tube 102 and the plate-like base member 101. Since this apparatus is subjected to high temperatures in the manufacturing process for solar cell modules, while being maintained in the vacuum state, the securing member 106 is required to have the heat resistance. The methods of securing include securing by filling a sealant in the clearance between the barrel tube 102 and the plate-like base member 101, in addition to securing by welding. For example, an RTV curable type silicone sealant can be used.

(Lid member)

The lid member 107 creates the space 108 in which the vacuum is created together with the barrel tube and the plate-like base member. And when creating the vacuum, it presses down the component material 110 of the solar cell module to promote deaeration through the component material. The lid member 107 should be sufficiently larger than the outer frame of the annular body. The characteristics required for the lid member 107 include heat resistance, flexibility, light weight and the airtightness in pulling the vacuum. The material for use is preferably silicone resin, the shape thereof being sheet-like.

(Net)

Figure 3:
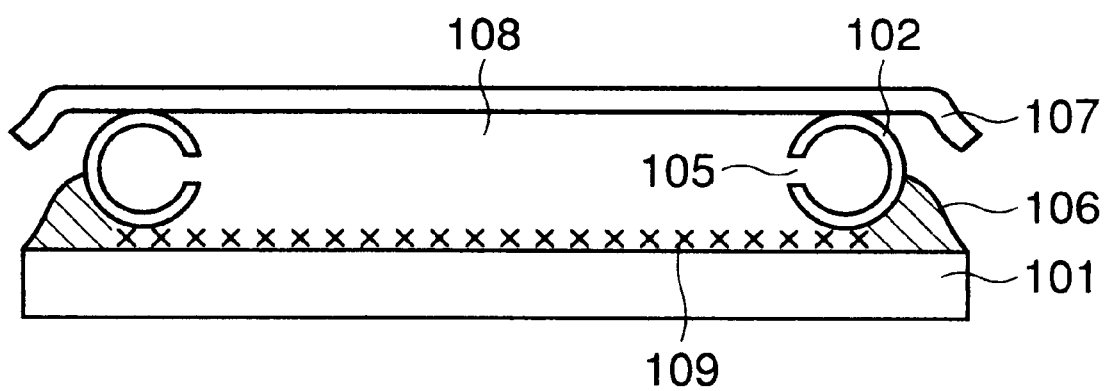
FIG. 3 is a view further having a net in FIG. 2.
Figure 4:
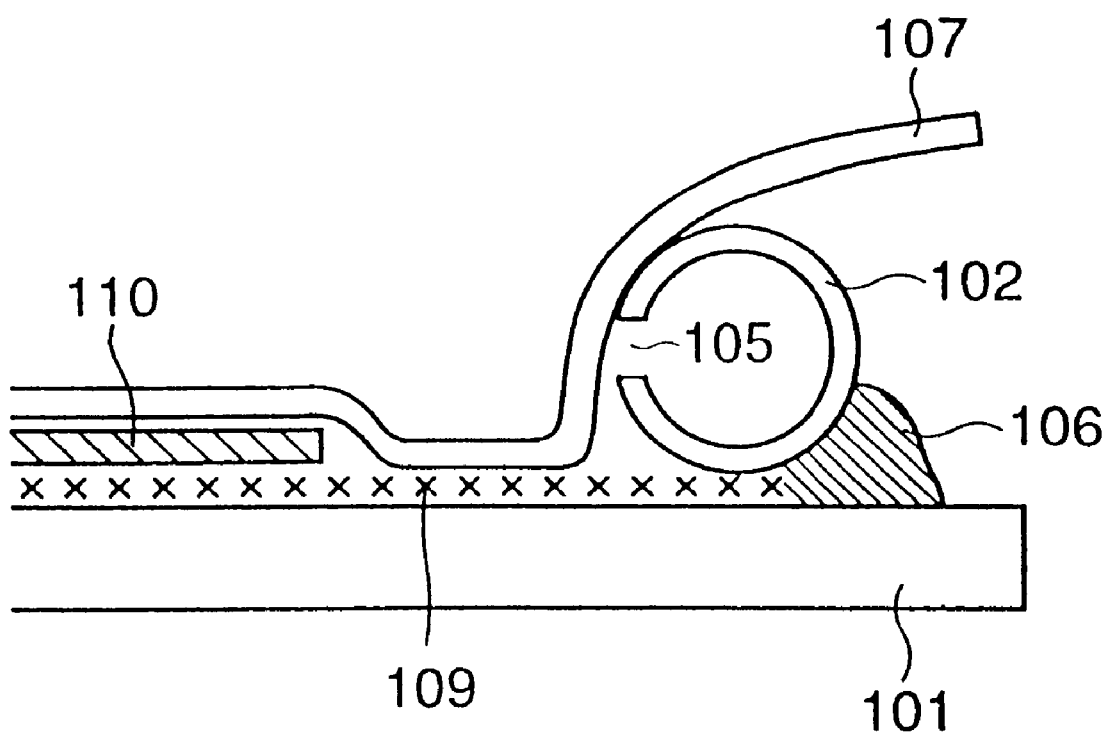
FIG. 4 is a view for explaining the effect of the net.

The net 109 is disposed between the plate-like base member 101 and the lid member 107 in the laminating space portion, as shown in FIG. 3, to prevent the contact between the plate-like base member 101 and the lid member 107 to shut off the flow of the air. This is shown in FIG. 4. 110 is a material treated for lamination. This material is identical in shape and size to the internal configuration of the annular body formed of the barrel tube 102. The characteristics required include heat resistance, flexibility, and light weight. The materials include a metallic net made of e.g. stainless or aluminum, and a net made of heat resistant resin fiber such as polyester.

Figure 5:
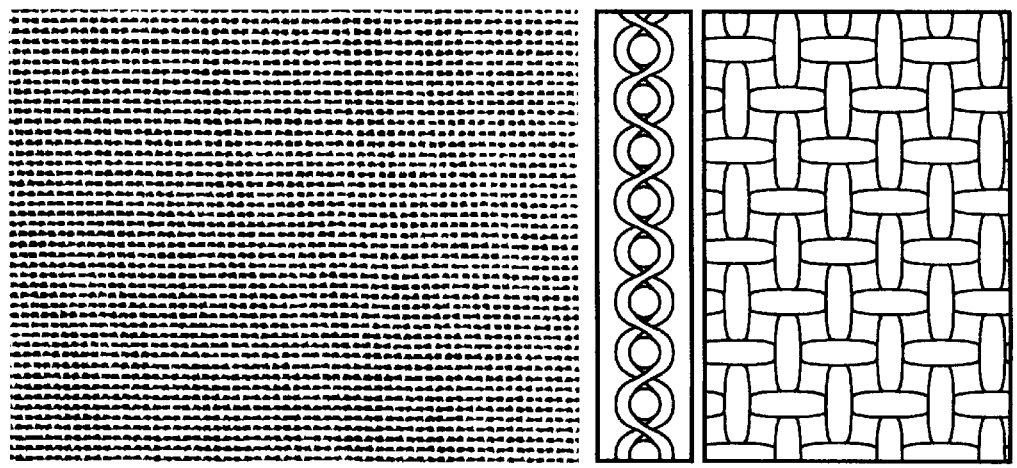
FIGS. 5, 6 and 7 are views showing the examples of the net.
Figure 6:
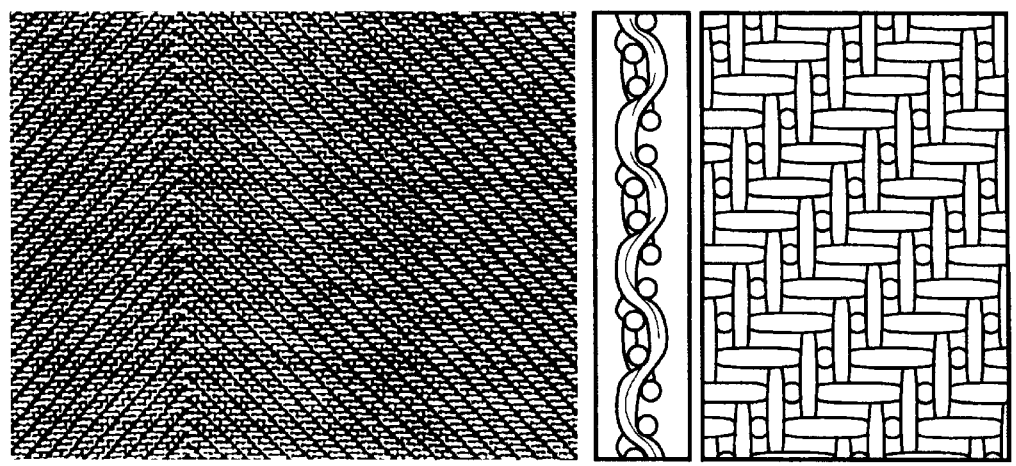
Figure 7:
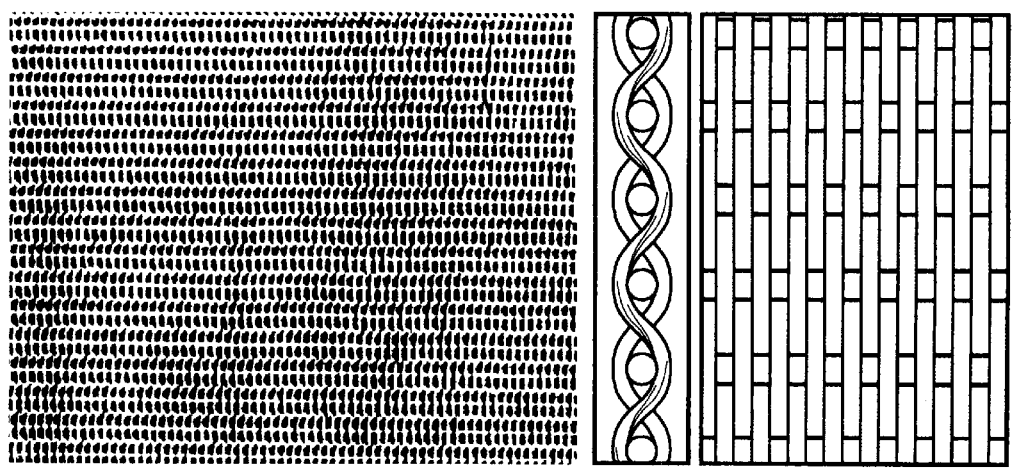

FIGS. 5 to 7 represent the specific examples of the net 109. FIG. 5 shows a plain woven type, FIG. 6 shows a twisted woven type, and FIG. 7 shows a plain mat woven type. The net is sandwiched between the plate-like base member and the lid member, and desirably has the ability of sufficiently passing the flow of the air, without being squashed, even if subjected to pressures in creating the vacuum. Also, the net is sheet-like in shape, with less surface irregularities, and desirably has no effect on the shape of the solar cell module after being laminated.

(Position of deaeration hole)

Figure 8:
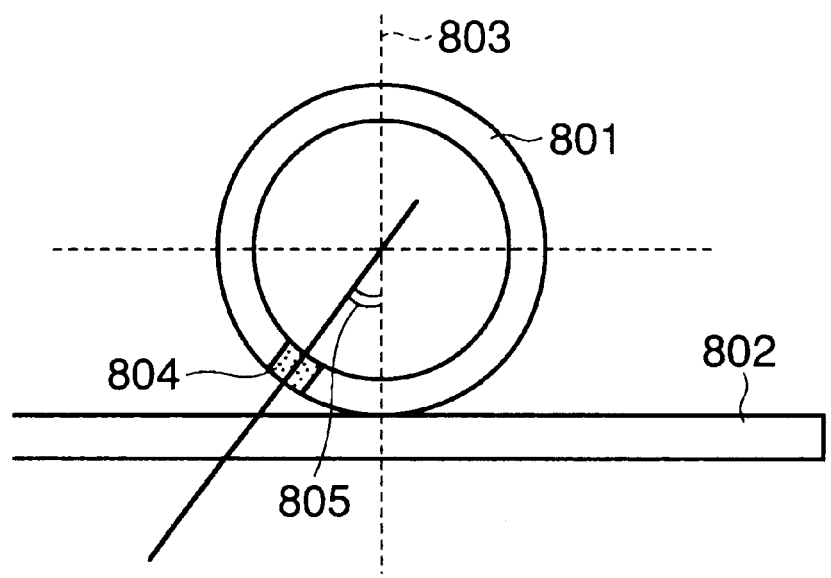
FIG. 8 is a view for defining the position of hole.

FIG. 8 shows the position of the deaeration hole. In FIG. 8, 801 is a barrel tube, 802 is a base member, 803 is a vertical plane of the base member, and 804 is a deaeration hole. 805 indicates an angle θ made by the line connecting the center of the tube and the deaeration hole with respect to the vertical plane. By this angle θ is defined a "position of deaeration hole".

Figure 9:
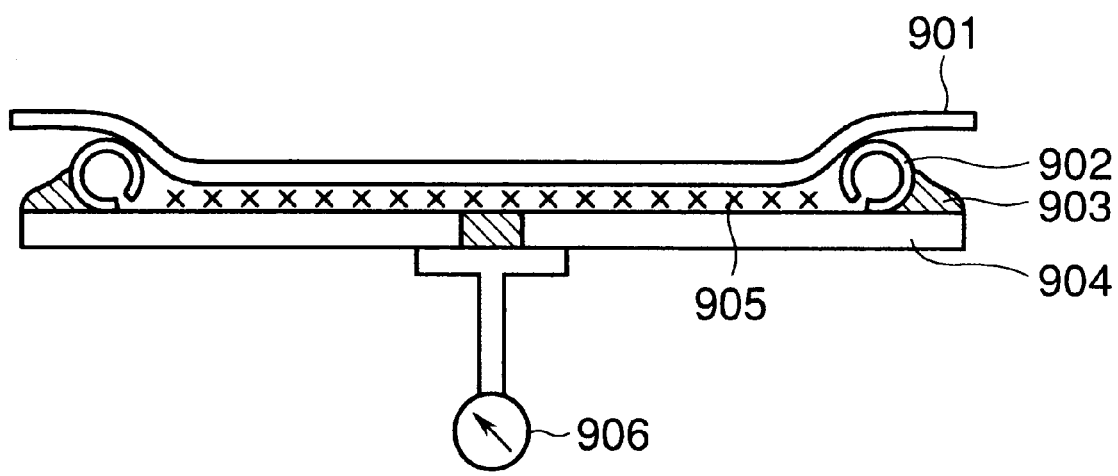
FIG. 9 is a view showing a measuring device for the degree of vacuum.

FIG. 9 shows the cross section of a jig used to measure the degree of vacuum within a laminating space when the angle θ is changed. In FIG. 9, 901 is a lid member, 902 is a barrel tube, 903 is a securing member, 904 is a plate-like base member, 905 is a net, and 906 is a vacuum gauge. Although not shown in FIG. 9, there is provided an opening portion as in FIG. 1, to which a valve is connected, the valve connecting to a vacuum pump. As used in measuring the degree of vacuum in FIG. 9, the lid member 901 was silicone rubber having a size of 1000×1600 mm (thickness; 2 t, hardness; 50, general-purpose type, made by Tigerspolymer), the barrel tube 902 was a stainless tube having an outer diameter of 900×1500 mm (stainless 316BA, with a tube diameter of ½ inch), the securing member 903 was an RTV silicone type sealant (trade mark "KE347"; made by Shinetsu Silicone Co.), the plate-like base member 904 was a weatherproofing steel plate having a size of 1000×1600 mm (e.g., trade mark "Bonde Steel Plate" made by Shin-Nippon Steel Co., surface-treated with phosphate, 1.6 t), and the net 905 was an SUS wire netting (diameter of wire; 0.4 mm, 20×20 mesh, degreased, made by Taiyo Wiring Net). In this vacuum jig, a deaeration hole was 3 mm in diameter, and was provided on all the four sides of the barrel tube at a pitch of 50 mm. Also, the vacuum pump (not shown) had a capacity of 135 m³/min.

Figure 10:
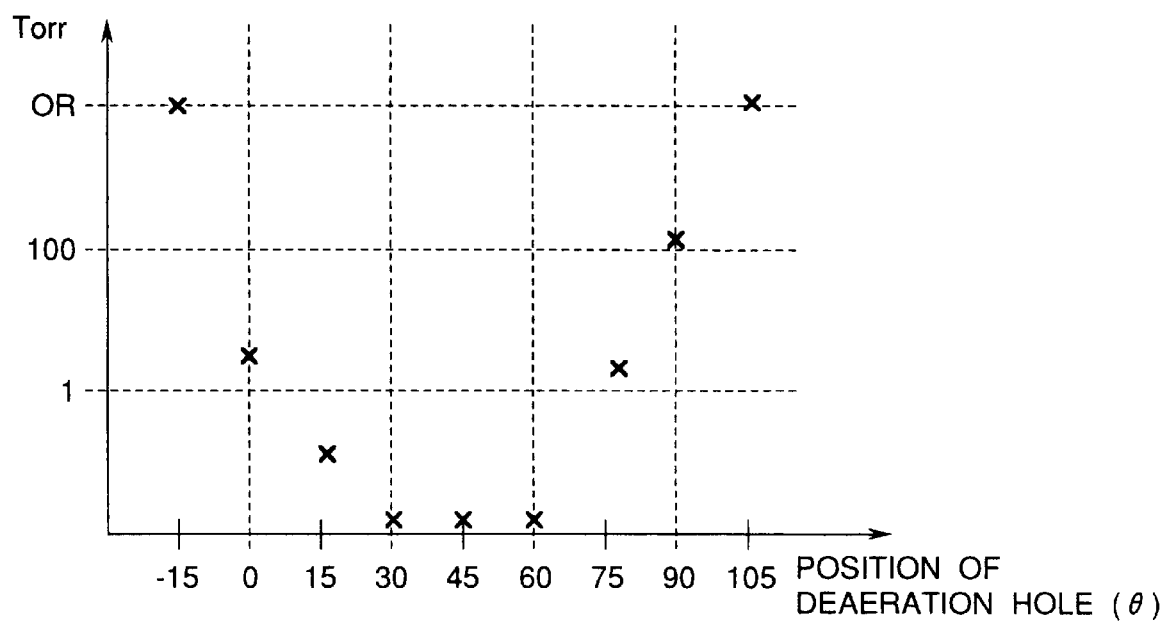
FIG. 10 is a graphical view representing the relation between the position of a deaeration hole and the degree of vacuum.

The results of measuring the degree of vacuum when θ is changed is represented in FIG. 10. Each measurement point indicates the degree of vacuum two minutes after starting to pull the vacuum.

It will be seen that the degree of vacuum is best when θ is near 45°, and less effective when closer to 0° or 90°. Because if the angle of elevation of the deaeration hole as looked from the vertical plane of the base member approaches 0°, the deaeration hole is closed by the plate-like base member, increasing the air resistance in pulling the vacuum. Also, if it approaches 90°, it is closed by the lid member. Accordingly, the position of the deaeration hole is preferably about 45°.

(Cushioning member)

Figure 11:
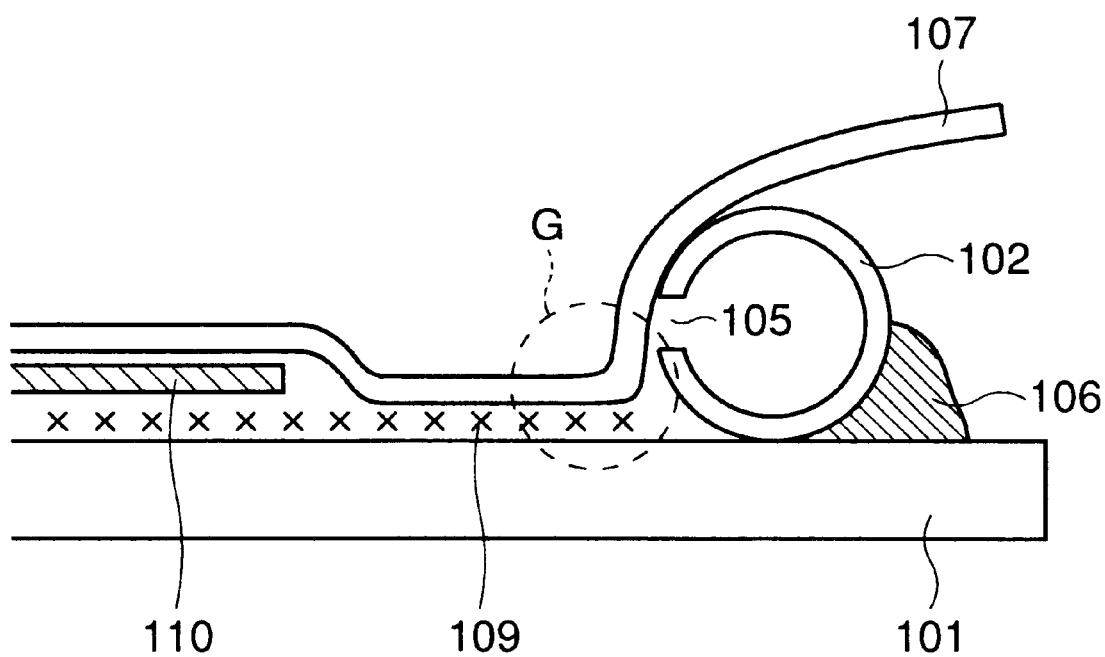
FIG. 11 is a view showing a steep bend of a lid member.

As shown in FIG. 11, in creating the vacuum, a portion of the lid member 107 in contact with the barrel tube 102 may be bent at an acute angle. Herein, the lid member is used in an abruptly raised state at G in the figure, i.e., an extremely bent state. If it is continued to be use in this state, a crack is more likely to occur at the bent portion of the acute angle due to repeated temperature stresses for the long term. As a result, there will occur the leakage to cause a failure of deaeration through the solar cell component material, with bubbles left within the solar cell module, resulting in bad appearance.

Figure 12:
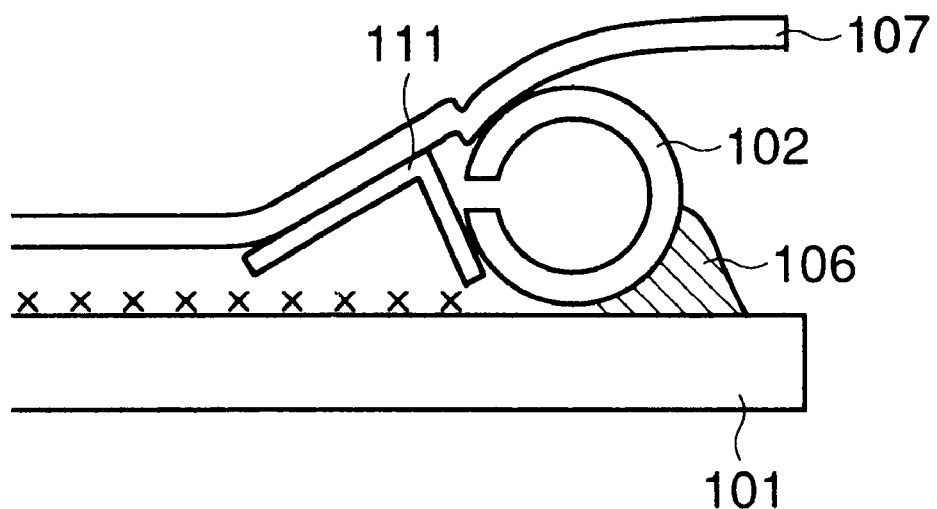
FIGS. 12 and 15 are views further having a cushioning material in FIG. 3.

Thus, if the cushioning member 111 is placed in contact with the inside of the annular body for the barrel tube 102, as shown in FIG. 12, the lid member 107 can be prevented from being bent at the extremely acute angle on the portion in contact with the barrel tube 102. The characteristics required for the cushioning member 111 include heat resistance and light weight.

Figure 13:
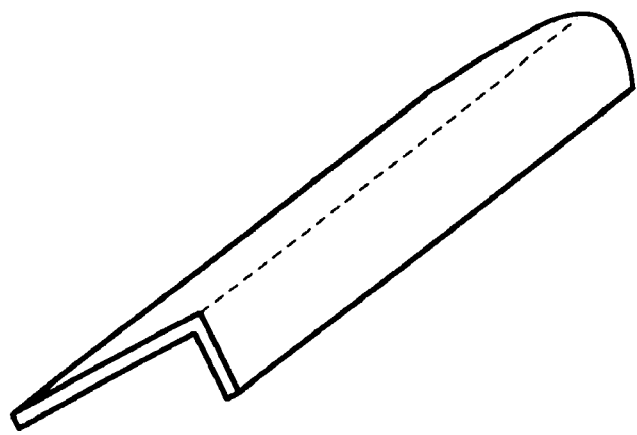
FIGS. 13 and 14 are views showing the examples of the cushioning material.
Figure 14:
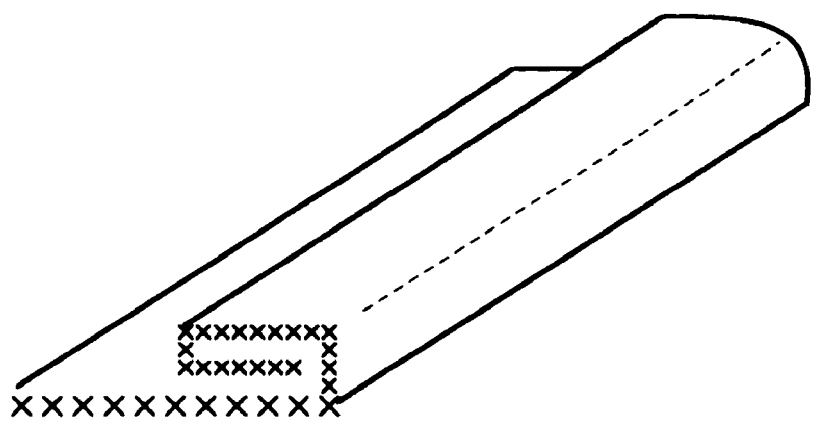
Figure 15:
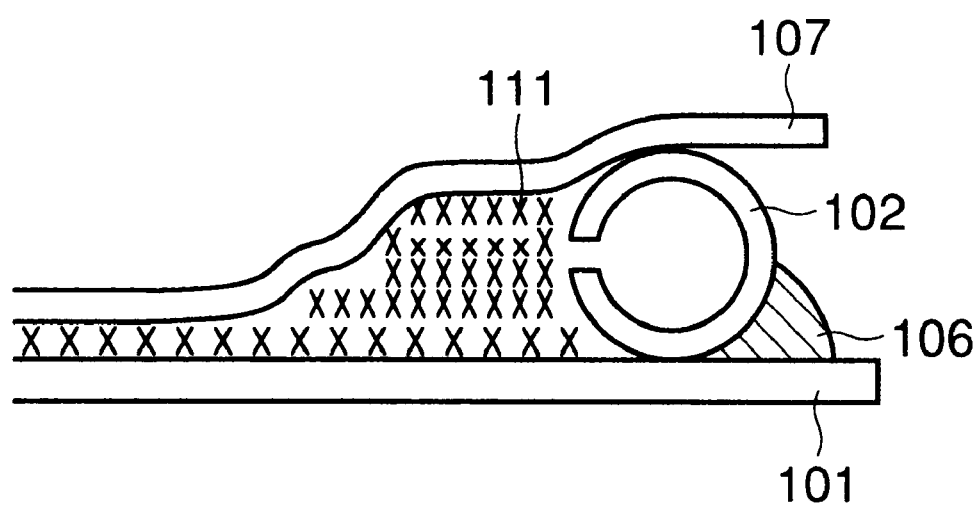

FIGS. 13 and 14 show examples of the cushioning member 111. FIG. 13 shows a cushioning member like a plate which is bent as an L-character, which is disposed along the barrel tube 102 as shown in FIG. 12, thereby preventing the lid member 107 from rising up at an acute angle. Also, FIG. 14 shows a cushioning member of a net folded over to be thicker, which is disposed along the barrel tube 102 as shown in FIG. 15, thereby preventing the lid member 107 from rising up at an acute angle. In the case of the cushioning member having the net folded over as in FIGS. 14 and 15, the air flow passage for the deaeration can be sufficiently secured, having the advantage that the conductance will not become too small. It is desired that the cushioning member as shown in FIGS. 13 and 14 is worked in thickness and shape such that the lid member may gradually rise with the diameter of the barrel tube.

EXAMPLES

Apparatus

Example 1

Figure 2:
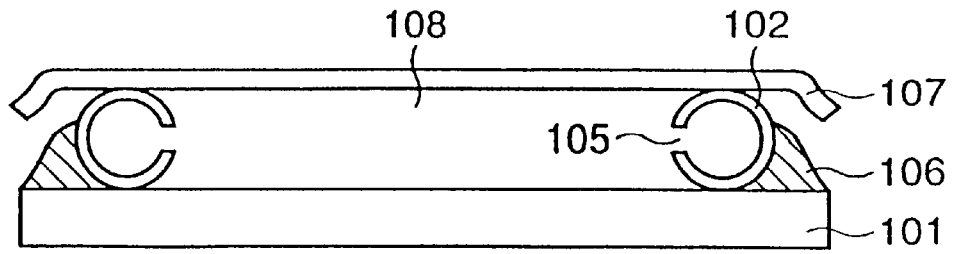
FIG. 2 is a cross-sectional view of FIG. 1, taken along 2—2.

This example describes a method of making an apparatus as shown in FIGS. 1. First, a barrel tube 102 forming a laminating space is placed on a plate-like base member 101. Then, a securing material 106 is flowed in from the outside (on the side opposite the space for pulling the vacuum) to fill the clearance between the barrel tube 102 and the plate-like base member 101. Herein, the plate-like base member 101 was a weatherproofing steel plate having a size of 900×1500 mm (e.g., trade mark "Bonde Steel Plate" made by Shin-Nippon Steel, surface-treated with phosphate, 1.6 t), the barrel tube 102 was a stainless tube having an outer diameter of annular body of 800×1400 mm (stainless 316BA, with a tube diameter of ½ inch), the deaeration holes having a hole diameter of 3 mm were provided on all the four sides of the barrel tube at a pitch of 50 mm, and the securing material was an RTV silicone type sealant (trade mark "KE347"; made by Shinetsu Silicone Co.). And this apparatus was left for 24 hours in the atmosphere within room to cure the RTV silicone type sealant to secure the barrel tube 102 on the plate-like base member.

Example 2

This example describes a method of making an apparatus as shown in FIG. 3 in which a net is provided within a laminating space. After securing the barrel tube to the base member with the securing material in example 1, the net of plain woven type having a size of 800×1400 mm (SUS wire netting; wire diameter of 0.4 mm, 20×20 mesh, treated with trichlene, made by Taiyo Wiring Net) was laid on the base member.

Example 3

This example describes a method of making an apparatus in which a cushioning member of FIG. 12 is provided to suppress the lid member from being bent at an acute angle. After laying a net thereon in example 2, the cushioning member 111 was made of a band-like member by folding a steel plate (as an L-character in cross section) having a thickness 0.8 mm (trade name; timer color GL; made by Daido Steel Sheet). Then, two band-like members having a length of 750 mm and two band-like members having a length of 1350 mm were prepared and disposed along the inside of the barrel tube (on the side of pulling the vacuum).

EXAMPLES

Laminating Method

Example 1

Figure 16:
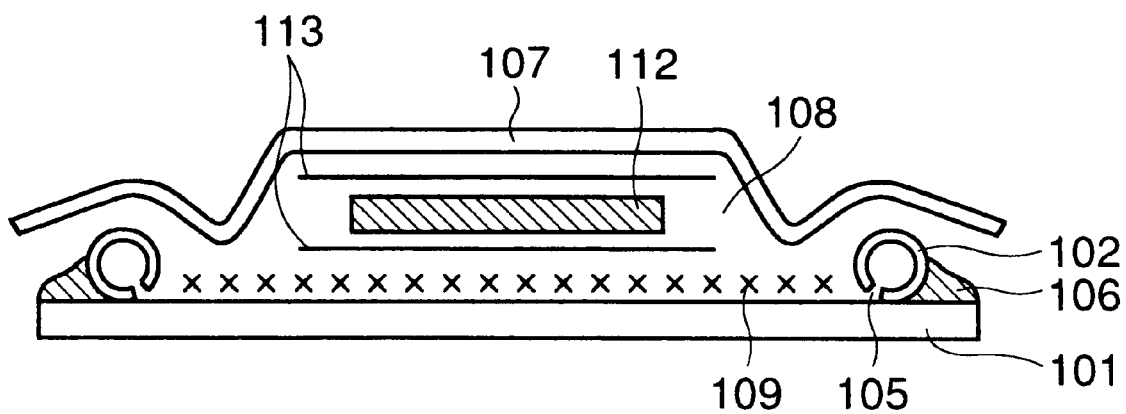
FIG. 16 is a view for explaining the usage of the apparatus of the invention.

A method for laminating a solar cell module with a vacuum laminating apparatus of the present invention is described. FIG. 16 is a cross-sectional view of the solar cell module disposed in a laminating space within the apparatus of the invention. In this example, the deaeration holes 105 are directed downwardly at 45° with respect to the horizontal, and a net 109 is provided. 112 is a solar cell module component material, and 113 is a filler flow preventing member for preventing leakage of the filler which is filled around the solar cell module component material. In this application example, these parts are subjected to lamination.

A procedure of making the solar cell module using the laminating apparatus of the example is described below. The filler flow preventing member 113 is placed in a space portion for pulling the vacuum within the laminating apparatus, the solar cell module component material 112 is disposed thereon, and further the filler flow preventing member 113 is placed thereon. After preparing them, the lid member 107 covers the entire annular body of the barrel tube 102.

Herein, the filler flow preventing member 113 used is a PTFE film (made by Asahi Glass). Also, the lid member 107 used a silicone rubber having a size of 1000×1600 mm (thickness; 2 t, hardness; 50, silicone resin general-purpose type, made by Tigerspolymer).

After the completion of preparing the abovementioned members, a vacuum pump 104 was started to create the vacuum into the laminating space 108 to exhaust and deaerate the air therefrom. In the deaerating state with the vacuum pump, the vacuum laminating apparatus was placed in a high-temperature oven, not shown, to elevate the temperature up to a value (about 150° C.) at which the filler in the material constituting the solar cell module was cured, and held for 30 minutes until the curing was ended. Thereafter, the apparatus was taken out from the oven, and cooled, and the vacuum pump was stopped to return the space portion to atmospheric pressure. With this procedure, the solar cell module was fabricated.

Figure 17:
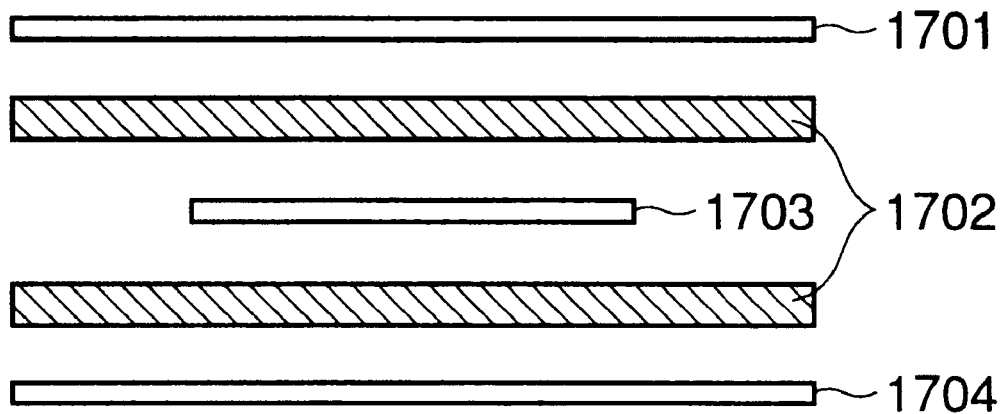
FIGS. 17 and 18 are conventional solar cell modules.
Figure 18:
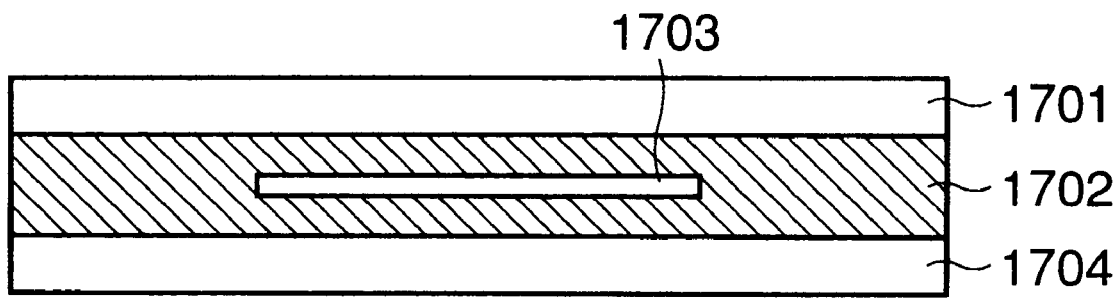

The constitution of the solar cell module was the same as the conventional ones. In FIG. 17, 1701 is a surface covering material, 1702 is a filler, 1703 is a solar cell element, and 1704 is a back covering material. The surface covering material 1701 used was a fluororesin film having a size of 500×1400 mm (trade mark "Non-drawable Tefzel"; made by E.I. du Pont, thickness; 50 μm), the filler 1702 used was EVA having a size of 500×1400 mm (trade mark "Weatherproofing grade"; made by Hisheet Industries, thickness; 460 μm), and the back covering material 1704 used was a weatherproofing coated steel plate having a size of 500×1400 mm (trade mark "Timer Color GL; made by Daido Steel Sheet, 0.4 t). The solar cell element 1703 used was an amorphous silicon solar cell deposited on a stainless substrate.

With the above procedure, a solar cell module having a size of 500×1400 mm was fabricated using the vacuum laminating apparatus of this example and the solar cell element as above mentioned.

Example 2

This variation is one in which a plate-like base member 101, a barrel tube 102, and a lid member 107 were enlarged in the above application example. The plate-like base member 101 was as large as 1200×5700 mm, the barrel tube 102 had an outer dimension of an annular body of 1150×5650 mm, and the lid member 107 used a silicone rubber as large as 1300×5800 mm, the barrel tube 102 of the annular body being ¾ inch in tube diameter. Also, the size of the solar cell component material was such that each of the surface covering material, the filler, and the back covering material was 800×5400 mm. A solar cell module having a large area of 800×5400 mm was fabricated in the same way as in the above application example, except for the abovementioned points of variation.

With the apparatus of the present invention, the uniform lamination was enabled without bubbles mixed inside even in the laminating process of large area as above described. Also, no big vacuum vessel was necessary.

Example 3

Figure 19:
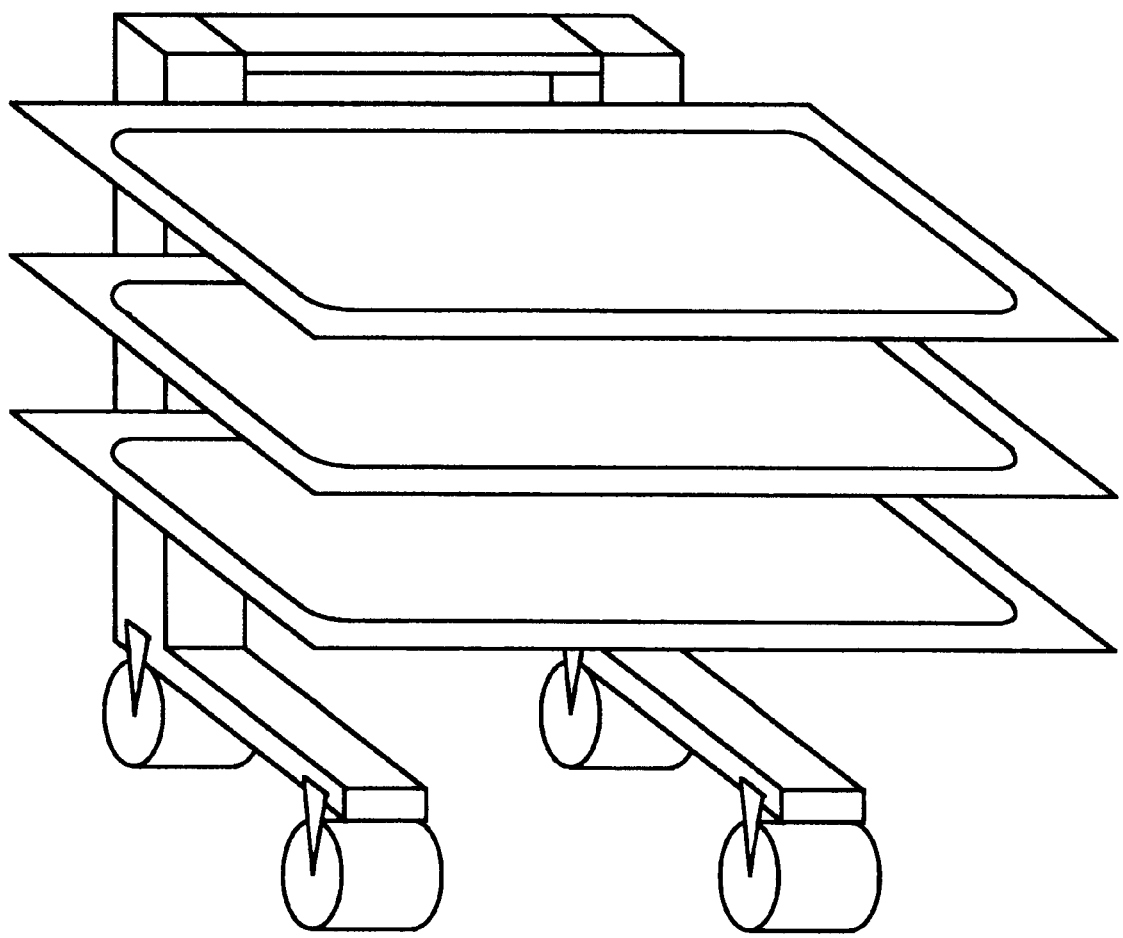
FIG. 19 shows a combination of a plurality of apparatuses of the invention.
Figure 20:
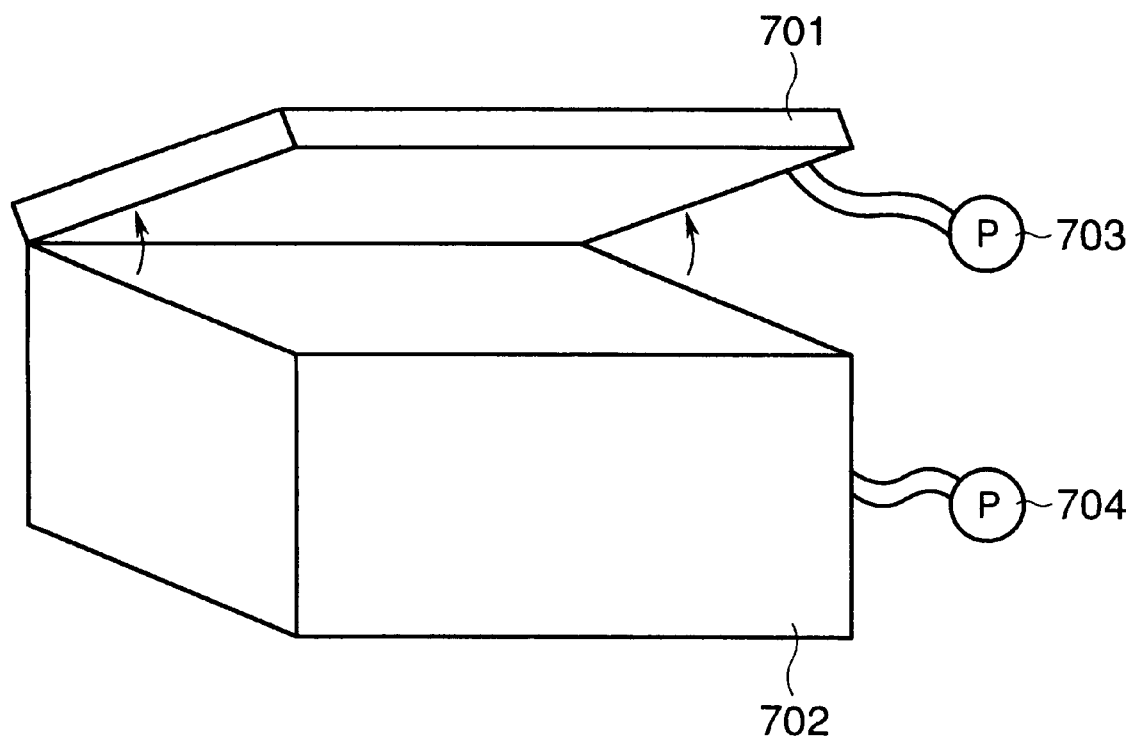
FIG. 20 is a conventional laminating apparatus.
Figure 21:
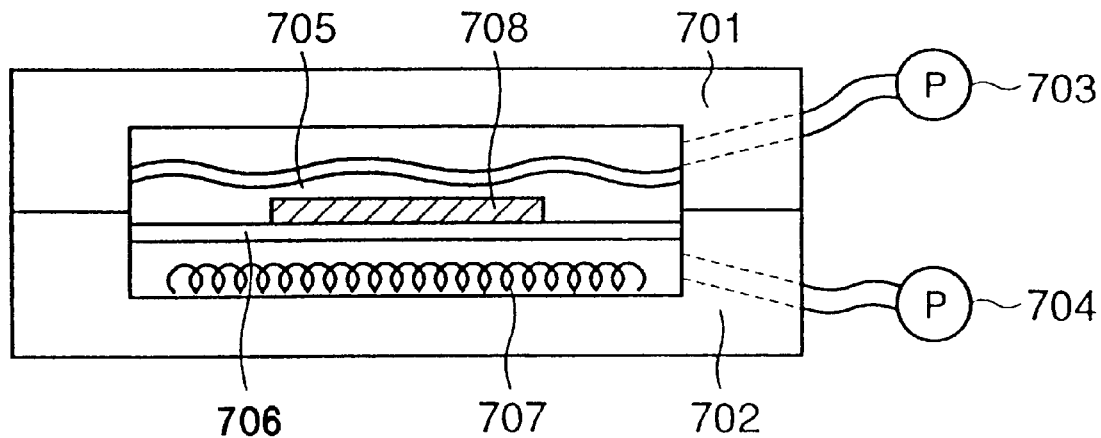
FIG. 21 is a cross-sectional view of the apparatus of FIG. 20.
Figure 22:
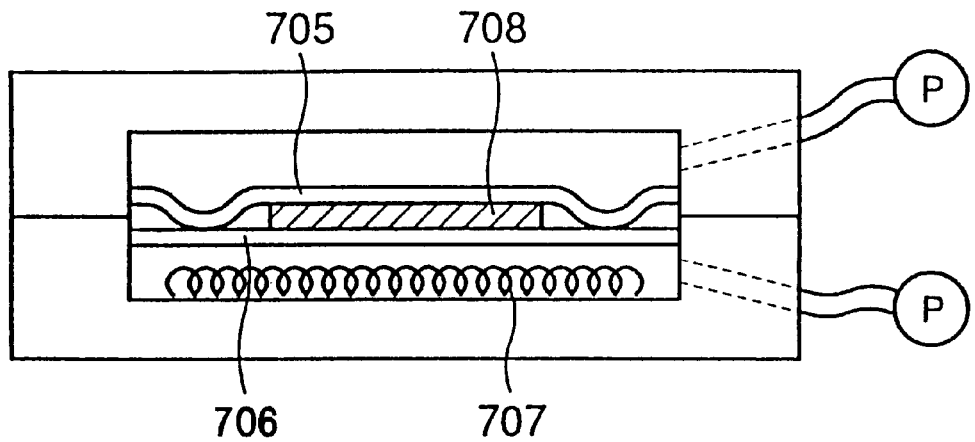
FIG. 22 is a view showing a conventional laminating method.

This variation is one in which three vacuum laminating apparatuses used in the above application example were prepared and arranged one over the other, and directly entered into an oven at the same time, to fabricate three solar cell modules through the heat treatment at a time. FIG. 19 shows the three vacuum laminating apparatuses which are installed on a predetermined carriage. In this form, three solar cell modules were fabricated at the same time. This variation was the same as the above application example, except that the three vacuum laminating apparatuses were placed on the carriage. This example makes it possible to perform efficient lamination.

A manufacturing apparatus for the solar cell module with the above constitution has the characteristics of simple structure, easy of fabrication of larger apparatus, shorter processing time, light weight, low cost, and high efficiency.

Note that the above example is one preferable example of the present invention, but the invention is not limited thereto, and may be subject to various variations without departing from the spirit or scope of the invention. For instance, while in this example, the vacuum laminating apparatus was applied to the manufacture of the solar cell module, the object of the lamination is not limited to the solar cell module.

As will be clear from the above description, a vacuum laminating apparatus and method of the present invention is accomplished by disposing the module material in a laminating space constituted of an annular body and a plate-like base member, and covering the entire surface of the laminating space defined by the annular body with a lid member. The heat treatment is conducted while vacuum is created in the laminating space covered with the lid member. This procedure or constitution is succinct and simple, making it possible to deal with large objects for processing, at higher speed, with shorter processing time, lower cost, and lighter weight.

What is claimed is:

1. A vacuum laminating method comprising the steps of:
   preparing a vacuum laminating device having a substrate, a tube for forming a laminating processing space on the substrate, with the tube enclosing the lamination processing space and having a deaeration hole on a side facing the lamination processing space, and a flexible lid member disposed on the tube and the lamination processing space;
   mounting a lamination material in the lamination processing space of the vacuum laminating device;
   providing a cushioning member close to the tube in the lamination processing space, wherein the cushioning member has a thickness and shape such that said lid member gradually rises with the diameter of said tube;
   drawing a vacuum in the lamination processing space through the deaeration hole by a vacuum pump connected to the tube;
   laminating the lamination material by heating the vacuum laminating device in an oven in a state when the vacuum pump is drawing a vacuum;
   cooling the vacuum laminating device by stopping the heating after the laminating step;
   putting the lamination processing space back in an atmospheric pressure by stopping to draw the vacuum after the cooling step; and
   taking the lamination material out of the lamination processing space.

2. A method according to claim 1, wherein the lamination material includes a solar battery module component material.

3. A method according to claim 2, wherein the solar battery module component material comprises a solar battery cell member, a filler member, a surface coating member and a back side coating member.

4. A method according to claim 3, wherein the back side coating member includes a steel plate.

5. A method according to claim 3, wherein the solar battery cell member includes an amorphous silicon.

6. A method according to claim 3, wherein the solar battery module component material is sandwiched by a filler flow preventing member when mounted on the lamination processing space.

7. A method according to claim 1, wherein a mesh is provided in the lamination processing space on the substrate of the vacuum laminating device.

8. A method according to claim 7, wherein the mesh is comprised of metal or heat durable resin.

9. A method according to claim 1, wherein a cross-sectional shape of the tube of the vacuum laminating device is circular or polygonal.

10. A method according to claim 1, wherein the tube of the vacuum laminating device is secured to the substrate by welding.

11. A method according to claim 1, wherein the tube of the vacuum laminating device is secured to the substrate by a sealant.

12. A method according to claim 1, wherein the cushioning member is inclined as it approaches the tube.

13. A vacuum laminating method comprising the steps of:
preparing a vacuum laminating device having a substrate, a tube for forming a laminating processing space on the substrate, with the tube enclosing the lamination processing space and having a deaeration hole on a side facing the lamination processing space, and a flexible lid member disposed on the tube and the lamination processing space;

mounting a lamination material in the lamination processing space of the vacuum laminating device;

providing a cushioning member close to the tube in the lamination processing space, wherein the cushioning member includes an L-shaped member;

drawing a vacuum in the lamination processing space through the deaeration hole by a vacuum pump connected to the tube;

laminating the lamination material by heating the vacuum laminating device in an oven in a state when the vacuum pump is drawing a vacuum;

cooling the vacuum laminating device by stopping the heating after the laminating step;

putting the lamination processing space back in an atmospheric pressure by stopping to draw the vacuum after the cooling step; and taking the lamination material out of the lamination processing space.

14. A method according to claim 13, wherein the lamination material includes a solar battery module component material.

15. A method according to claim 14, wherein the solar battery module component material comprises a solar battery cell member, a filler member, a surface coating member and a back side coating member.

16. A method according to claim 15, wherein the back side coating member includes a steel plate.

17. A method according to claim 15, wherein the solar battery cell member includes an amorphous silicon.

18. A method according to claim 15, wherein the solar battery module component material is sandwiched by a filler flow preventing member when mounted on the lamination processing space.

19. A method according to claim 13, wherein a mesh is provided in the lamination processing space on the substrate of the vacuum laminating device.

20. A method according to claim 19, wherein the mesh is comprises of metal or heat durable resin.

21. A method according to claim 13, wherein an axis connecting a center of the tube and a center of the deaeration hole is at an angle $\theta$ of 0 to 90 degrees, where the angle $\theta$ is defined at an intersection of the axis and a line normal to a surface of the substrate and extending through the center of the deaeration hole.

22. A method according to claim 21, wherein the angle $\theta$ is 45 degrees.

23. A method according to claim 13, wherein a cross-sectional shape of the tube of the vacuum laminating device is circular or polygonal.

24. A method according to claim 13, wherein the tube of the vacuum laminating device is secured to the substrate by welding.

25. A method according to claim 13, wherein the tube of the vacuum laminating device is secured to the substrate by a sealant.

* * * * *

UNITED STATES PATENT AND TRADEMARK OFFICE
CERTIFICATE OF CORRECTION

PATENT NO. : 6,007,650

DATED : December 28, 1999

INVENTOR(S): SHIGENORI ITOYAMA, ET AL.

It is certified that error appears in the above-identified patent and that said Letters Patent is hereby corrected as shown below:

<u>COLUMN 10</u>:

Line 25, "comprises" should read --comprised--.

Signed and Sealed this

Tenth Day of April, 2001

*Attest:*

NICHOLAS P. GODICI

*Attesting Officer*     *Acting Director of the United States Patent and Trademark Office*